Figure 1:
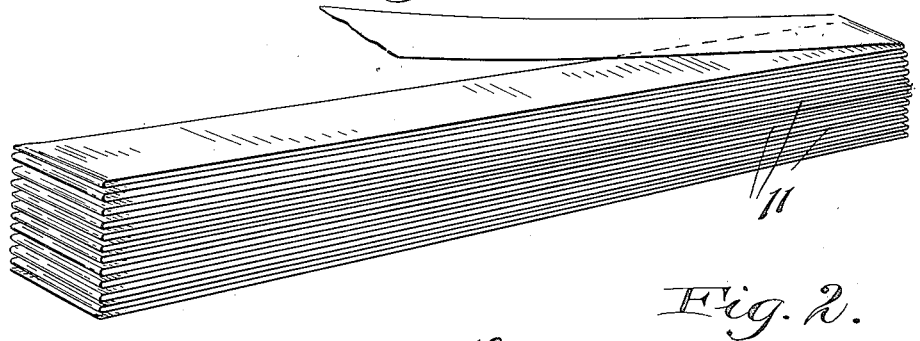

T. A. WILLARD.
STORAGE BATTERY SEPARATOR AND PROCESS OF PRODUCING THE SAME.
APPLICATION FILED FEB. 1, 1915.

1,243,370.

Patented Oct. 16, 1917.

Witnesses
E. B. Gilchrist
C. V. Schurger

Inventor
Theodore A. Willard
by Thurston & Kwis
Attys.

UNITED STATES PATENT OFFICE.

THEODORE A. WILLARD, OF CLEVELAND, OHIO.

STORAGE-BATTERY SEPARATOR AND PROCESS OF PRODUCING THE SAME.

1,243,370.  Specification of Letters Patent.  Patented Oct. 16, 1917.

Application filed February 1, 1915. Serial No. 5,588.

*To all whom it may concern:*

Be it known that I, THEODORE A. WILLARD, a citizen of the United States, residing at Cleveland, in the county of Cuyahoga and State of Ohio, have invented a certain new and useful Improvement in Storage-Battery Separators and Processes of Producing the Same, of which the following is a full, clear, and exact description.

This invention relates to storage battery separators and to the process of producing the same, and is an improvement over the separator and the process constituting the subject matter of my prior application #848,296, filed June 30th, 1914.

In accordance with the invention disclosed in my prior application, the separators are produced by cutting or slicing a previously prepared block or body into sections, said block or body being composed of rubber or other suitable material in which is embedded porous or porosity producing material, and as disclosed in said application said block or body is preferably formed or built up of alternate layers of rubber and woven cloth or fabric, and before being sliced is compressed and vulcanized. The separator which is thus produced is provided with numerous uniformly distributed minute pores, and is far more durable than the common wood separators, and is a great deal more efficient than separators formed of rubber because the pores are more numerous and more minutes than the pores or openings which heretofore could be formed in a rubber separator.

The object of the present invention is to provide certain improvements in the method of producing the separators and in the separators themselves such that the separators will have greater mechanical strength and greater porosity, and hence higher efficiency and can be more cheaply produced.

In accordance with the present invention, the block or body from which the separator sections are cut, is formed from porous material coated or impregnated with rubber or other suitable cementitious substance rather than from alternate layers of rubber or other non-porous insulating material, and porous material as in my prior application. Preferably the block or body is formed of considerable length by superimposed layers of rubber coated cloth or fabric which is placed layer upon layer until a block of proper thickness is produced. Subsequently, the block is subjected to compression, and is vulcanized if the binding or cementitious material is formed of rubber, and thence the block is cut into sections of the desired thickness producing a separator or separator section which is less expensive to make and has greater porosity than the separators produced in accordance with my prior method and which at the same time possesses all the other advantages of my prior separators as to mechanical strength and durability.

My invention may be further briefly summarized as consisting in a separator having a certain novel construction and characteristics and in certain novel steps of the herein described process or method of producing the same.

Figure 2:
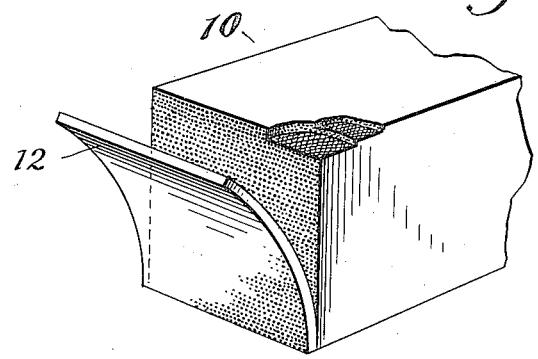
Figure 3:
Figure 4:
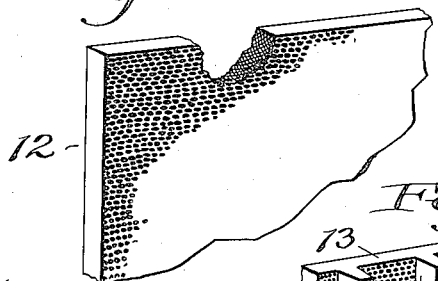
Figure 5:
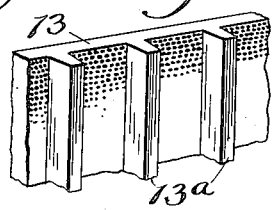
Figure 6:
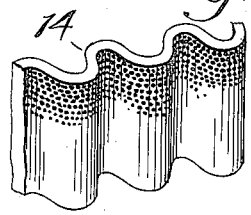

In the accompanying sheet of drawings, Figure 1 is a perspective view of the partially formed block or body showing the manner in which it is formed or built up of superimposed layers of coated fibrous material in the form of cloth or fabric; Fig. 2 is a similar view of a portion of the block showing the manner in which it is cut into separator sections; Fig. 3 is an enlarged sectional view through a portion of the coated fabric showing in a somewhat exaggerated manner the strands thereof and the interstices filled with the compound; Fig. 4 is a perspective view of a portion of a separator section formed in accordance with my invention; and Figs. 5 and 6 are perspective views illustrating some of the forms of the finished separator.

Referring now to the drawings, 10 represents the block or body which while preferably formed in the manner hereinafter described may be otherwise formed. In the present case this block or body is built up not of alternate layers of rubber and porous material as in my prior application, but preferably by placing layer upon layer until the proper number of layers are superimposed, coated porous material in the form of a long strip 11, such as is illustrated in Fig. 1. This coated porous material preferably consists of inexpensive cotton cloth or fabric of indeterminate length and of predetermined width coated in any suitable manner with a plastic binding and non-porous insulating material. For the coating I may use several different materials, but prefer to use rubber or rubber compound. In some instances I may use celluloid, or a celluloid compound, which can be dissolved in a suitable solvent, or other coating materials may be employed, although rubber is believed to be the most efficient and satisfactory in all respects. The coating may be applied in various ways, as by passing rubber and cloth between a pair of suitably driven rolls which cause the rubber to completely fill all the interstices of the cloth, and at the same time put a very thin coat or film on each side of the cloth. However, the cloth or other fibrous material may be otherwise coated, as by a brush or by a dipping process.

While I prefer to use woven cloth for the porous material, other porous material may be employed, such as threads, cords or unwoven strands or fiber which can be coated and arranged in strips or layer form.

The number of layers which are superimposed or the height of the block, and also the width of the block may be varied. The cross sectional dimensions of the block, after the latter is completed and is ready to be cut will depend upon the size of the separator and whether or not a single or a plurality of separator sections are to be formed from each section cut from the block. In other words, the section that is cut from the block may correspond in dimensions to the dimensions of a single separator, or it may be of such a size that a plurality of separators can be cut from each section, as will be readily understood.

After the block has been built up of the requisite number of superimposed layers of coated fibrous material, the block is compressed and hardened. If rubber is employed as the cementitious material the block will be compressed and vulcanized at the same time. If celluloid or non-vulcanizing material is employed for the plastic binding material with which the fibrous material is coated, the block will be compressed and subjected to a drying or other hardening process. By the pressure and vulcanizing or hardening process a solid homogeneous block is produced composed of very closely associated layers of porous material extending the length of the block with the layers thoroughly united by the now hardened non-porous binding material which completely fills all the interstices, and is practically continuous from one face of the block to the other, that is, the individuality of the layers is lost and there now exists a solid composite body formed principally of the fibrous porous material bound or cemented together. It is not essential that the block be completely vulcanized or hardened before being cut into the separator sections, as the latter may be subsequently treated to finish the same.

Next, the block is cut or sliced by any suitable cutting means into sections 12 of a thickness corresponding or substantially corresponding to the thickness of the separator itself. As before stated, this section will be of the dimensions of the separator, or the section may be divided into sub-sections, each of the required size for a separator. This completes the separator, if a flat separator is to be employed. Usually, however, instead of the separator being flat, it is provided with uneven surfaces such as are produced by corrugations. To produce the finished separator in any shape desired, the separator section cut from the block may have ribs or projections cemented or vulcanized to one or both of its faces, or the separator section may be placed in a suitable press or vulcanizer which will alter its configuration or shape to that desired, for example, to the corrugated shape. In Fig. 5 I have illustrated at 13 a ribbed separator wherein the ribs 13$^a$ may be formed either by grinding the flat face of the separator or by cementing or vulcanizing the ribs to the separator body. In Fig. 6 I have illustrated at 14 a corrugated separator, the corrugated shape being produced by treating the section cut from the block either in a vulcanizing mold or in a mold not requiring a vulcanizing action. Additionally, the separator may be made to assume other shapes, as will be readily understood.

In the drawings, I have not attempted to show the parts in their true proportions, nor the actual spacing of the layers of fibrous material as the latter are in reality more closely spaced than could be conveniently shown in the drawings.

While I have described the preferred construction of the separator and the best way now known to me of constructing or producing the same, I do not wish to be confined to the exact details shown either as to the form of the separator or as to the precise manner of producing the same, as both the construction of the separator and the process of producing the same herein described may be varied without departing from the spirit and scope of my invention in its broadest aspects.

Having thus described my invention, what I claim is:—

1. The method of producing storage battery separators, which comprises forming a body from fibrous material united with a relatively small amount of a cementitious substance, and cutting the body into separator sections so that the fibrous material extends through the sections.

2. The method of producing storage battery separators, which comprises forming a body from porous material impregnated with a non-porous binding substance, and cutting the body into sections in such a manner that the porous material extends from side to side through the sections.

3. The method of producing storage battery separators, which comprises building up a block from porous material coated with a binding substance and subsequently slicing the block into sections.

4. The method of producing storage battery separators, which comprises building up a block from layers of fabric impregnated with a binding substance, and slicing the block into separator sections.

5. The method of producing storage battery separators, which comprises forming a body from porous material coated with rubber, and subsequently slicing the body into sections, with the porous material extending from side to side through the latter.

6. The method of producing storage battery separators, which comprises building up a body from superimposed layers of porous material coated with rubber, and subsequently slicing the body into sections having the porous material extending from side to side through the latter.

7. The method of producing storage battery separators, which comprises building up a block from layers of rubber-coated cloth, and slicing the block into separator sections.

8. The method of producing storage battery separators, which comprises building up a block from layers of rubber-coated cloth, vulcanizing the block, and slicing the block into separator sections.

9. The method of producing storage battery separators, which comprises building up a block of porous material coated with a cementitious substance, subjecting the block to pressure, and slicing the block into separator sections having the porous material extending from side to side through the same.

10. The method of producing storage battery separators, which comprises building up a block from layers of rubber-coated fibrous material, compressing and vulcanizing the block, and then slicing the block into separator sections having fiber extending through the sections from one side thereof to the other.

11. The method of producing storage battery separators which comprises forming a body from porous material coated with a cementitious substance, cutting the body into separator sections through which the porous material extends and forming an uneven surface on one or both sides of a section.

12. A storage battery separator having a body of porous material coated and held together with a relatively small amount of a cementitious substance.

13. A storage battery separator composed of porosity producing material extending from one side of the separator to the other and bound together with a relatively small amount of cementitious material.

14. A storage battery separator formed of porosity producing material extending from one side of the separator to the other and bound together by a relatively small amount of vulcanized rubber.

In testimony whereof, I hereunto affix my signature in the presence of a witness.

THEODORE A. WILLARD.

Witness:
A. F. KWIS.